US007203196B2

United States Patent
Jiang

(10) Patent No.: US 7,203,196 B2
(45) Date of Patent: Apr. 10, 2007

(54) DATA DISCARD SIGNALLING PROCEDURE IN A WIRELESS COMMUNICATION SYSTEM

(75) Inventor: Sam Shiaw-Shiang Jiang, Hsinchu (TW)

(73) Assignee: Asustek Computer Inc., Taipei (TW)

( * ) Notice: Subject to any disclaimer, the term of this patent is extended or adjusted under 35 U.S.C. 154(b) by 1013 days.

(21) Appl. No.: 10/356,563

(22) Filed: Feb. 3, 2003

(65) Prior Publication Data

US 2003/0147396 A1    Aug. 7, 2003

(51) Int. Cl.
*H04L 12/28* (2006.01)
*H04L 12/56* (2006.01)

(52) U.S. Cl. ...................................... 370/394

(58) Field of Classification Search ................ 370/394, 370/350, 468, 349, 346, 324; 455/438, 437, 455/439
See application file for complete search history.

(56) References Cited

U.S. PATENT DOCUMENTS

| 2001/0030965 A1 | 10/2001 | Tourunen et al. | |
| 2002/0107019 A1* | 8/2002 | Mikola et al. | 455/436 |
| 2004/0208160 A1* | 10/2004 | Petrovic et al. | 370/350 |

FOREIGN PATENT DOCUMENTS

WO    WO 01/59979 A2    8/2001

OTHER PUBLICATIONS

"Universal Mobile Telecommunications System (UMTS); Radio Link Control (RLC) Protocol Specification (3GPP TS 25.322 Version 4.3.0 Release 4)", ETSI Technical Specification, Dec. 2001.
Byung-Gon Chun et al., "Auxiliary Timeout and Selective Packet Discard Schemes to Improve TCP Performance in PCN Environment", IEEE, Jun. 1997.
"Agreed CRs (Release '99 and Rel-4 category A) to TS 25.322", TSG-RAN Meeting #14, Dec. 11-14, 2001, 25.322 CR 151: pp. 1-68; 25.322 CR 152: pp. 1-68; 25.322 CR 155: pp. 1, 2, 40-44; 25.322 CR 156: pp. 1, 2, 40-44; 25.322 CR 157: pp. 1, 2, 18-20, 49-50, 52-54; 25.322 CR 158: pp. 1, 2, 18-20, 49-50, 52-54; 25.322 CR 159: pp. 1, 2, 60-62; 25.322 CR 161: pp. 1-5; 25.322 CR 162: pp. 1-5; 25.322 CR 163; pp. 1-7; 25.322 CR 164: pp. 1-3: 25.322 CR 167: pp. 1-4, Kyoto, Japan.

* cited by examiner

*Primary Examiner*—Chi Pham
*Assistant Examiner*—Prenell Jones
(74) *Attorney, Agent, or Firm*—Birch, Stewart, Kolasch & Birch, LLP

(57) ABSTRACT

The invention provides a data discard signalling procedure in a wireless communication system. If data is discarded by the transmitter, the transmitter needs to notify the receiver of the discard. A shortened move receiving window super-field is used to request the receiver to move its reception window and optionally to indicate the set of discarded RLC SDUs, as a result of an RLC SDU discard in the sender. A move receiving window acknowledgement super-field acknowledges the reception of a MRW SUFI. If various criteria are met, the SDU discard with explicit signalling procedure can be efficiently terminated resulting in increased transmission throughput. Utilizing the data discard signalling procedure of the present invention, transmission throughput is increased and the transmission performance is improved.

3 Claims, 4 Drawing Sheets

DATA DISCARD SIGNALLING PROCEDURE IN A WIRELESS COMMUNICATION SYSTEM

BACKGROUND OF THE INVENTION

1. Field of the Invention

The present invention relates to a wireless communications protocol. More specifically, the present invention discloses a data discard signalling procedure.

2. Description of the Prior Art

In a wireless communication system, a protocol data unit (PDU), which contains a segment of a service data unit (SDU), may be transmitted and retransmitted for a maximum number of transmissions without positive acknowledgement from the peer receiver. To control the transmission window of the sender, a state variable VT(A) is defined to be the sequence number (SN) following the SN of the last in-sequence acknowledged PDU. Alternatively, to control the reception window of the receiver, a state variable VR(R) is defined to be the SN following the SN of the last in-sequence PDU received. Another state variable, VR(H), is defined to be the SN following the highest SN of any received PDU. A data (SDU) may be transmitted and retransmitted within a predefined duration of time. After a time out period or after the number of transmissions has reached a maximum number, the SDU is deemed out-of-date and is discarded by the transmitter. For acknowledged mode (AM) transmission, the transmitter needs to signal the receiver of the discard of the SDU so that the receiver can move its reception window accordingly. This signalling procedure is called an SDU discard with explicit signalling procedure. Refer to FIG. 1 which illustrates the procedure.

A move receiving window (MRW) super-field 120 is utilized to request the receiver 110 to move its reception window and optionally to indicate the set of discarded Radio Link Control (RLC) SDUs, as a result of an RLC SDU discard in the Sender 100. The receiver 110 responds with an acknowledge signal 130.

However, in certain situations, the SDU discard with explicit signalling procedure will not be terminated. In these situations the receiver 110 has moved its reception window to a position which is exactly what the sender 100 wanted to signal to the receiver 110. If the procedure is not terminated when this criterion is fulfilled, the sender 100 must retransmit MRW SUFI 120 when an MRW timer expires. This will waste radio resources and slow down the transmission throughput.

Furthermore, if the number of transmissions of MRW SUFI 120 reaches its maximum value when this criterion is fulfilled, the RLC entity will unnecessarily reset itself. This results in a degradation of transmission performance.

Therefore, there is a need for a more efficient data discard signalling procedure that improves transmission throughput and performance.

SUMMARY OF THE INVENTION

To achieve these and other advantages and in order to overcome the disadvantages of the conventional method in accordance with the purpose of the invention as embodied and broadly described herein, the present invention provides a data discard signalling procedure which efficiently improves transmission throughput and performance.

A move receiving window super-field (MRW SUFI) is used to request the receiver to move its reception window and optionally to indicate the set of discarded RLC SDUs, as a result of an RLC SDU discard in the sender.

A length field of 4 bits indicates the number of $SN\_MRW_i$ fields in the super-field of type MRW.

The values "0001" through "1111" indicate $SN\_MRW_i$ 1 through 15 respectively. The value "0000" indicates that one $SN\_MRW_i$ field is present and that the RLC SDU to be discarded in the receiver extends above the configured transmission window in the Sender.

The $SN\_MRW_i$ fields are 12 bits each. When "Send MRW" is configured, an $SN\_MRW_i$ shall be used to indicate the end of each discarded RLC SDU, i.e. the number of $SN\_MRW_i$ fields shall equal the number of RLC SDUs discarded by that MRW SUFI. When "Send MRW" is not configured, an $SN\_MRW_i$ field shall be used to indicate the end of the last RLC SDU to be discarded in the Receiver and additional ones may optionally be used to indicate the end of other discarded RLC SDUs.

$SN\_MRW_i$ is the sequence number of the PDU that contains the length indicator of the i:th RLC SDU to be discarded in the receiver (except for $SN\_MRW_{LENGTH}$ when $N_{LENGTH}=0$). The order of the $SN\_MRW_i$ shall be in the same sequential order as the RLC SDUs that they refer to.

Additionally, $SN\_MRW_{LENGTH}$ requests the receiver to discard all PDUs with a sequence number less than $SN\_MRW_{LENGTH}$, and to move the reception window accordingly.

Furthermore, when $N_{LENGTH}$ is greater than 0, the receiver has to discard the first $N_{LENGTH}$ length indicators and the corresponding data octets in the PDU with sequence number $SN\_MRW_{LENGTH}$.

$N_{LENGTH}$ is 4 bits and is used together with $SN\_MRW_{LENGTH}$ to indicate the end of the last RLC SDU to be discarded in the receiver.

$N_{LENGTH}$ indicates which length indicator in the PDU with sequence number $SN\_MRW_{LENGTH}$ corresponds to the last RLC SDU to be discarded in the receiver. $N_{LENGTH}$ equal to 0 indicates that the last RLC SDU ended in the PDU with sequence number $SN\_MRW_{LENGTH}$ minus 1 and that the first data octet in the PDU with sequence number $SN\_MRW_{LENGTH}$ is the first data octet to be reassembled next.

A move receiving window acknowledgement (MRW_ACK) super-field acknowledges the reception of an MRW SUFI. The N field is 4 bits and is set equal to the $N_{LENGTH}$ field in the received MRW SUFI if the SN_ACK field is equal to the $SN\_MRW_{LENGTH}$ field. Otherwise N shall be set to 0.

With the aid of this field in combination with the SN_ACK field, it can be determined if the MRW_ACK corresponds to a previously transmitted MRW SUFI.

The SN_ACK field is 12 bits and indicates the updated value of VR(R) after the reception of the MRW SUFI. With the aid of this field in combination with the N field, it can be determined if the MRW_ACK corresponds to a previously transmitted MRW SUFI.

The acknowledgement super-field (ACK SUFI) consists of a type identifier field (ACK) and a sequence number (LSN).

The LSN field is 12 bits and acknowledges the reception of all PDUs with sequence number less than last sequence number (LSN) that are not indicated to be erroneous in earlier parts of the STATUS PDU. This means that if the LSN is set to a value greater than VR(R), all erroneous PDUs shall be included in the same STATUS PDU and if the LSN is set to VR(R), the erroneous PDUs can be split into several STATUS PDUs. At the sender or transmitter, if the value of the LSN is less than or equal to the value of the first error indicated in the STATUS PDU, VT(A) will be updated according to the LSN. Otherwise VT(A) will be updated according to the first error indicated in the STATUS PDU. VT(A) is only updated based on STATUS PDUs where ACK SUFI (or MRW_ACK SUFI) is included. The LSN shall not be set to a value greater than VR(H) or less than VR(R).

In situations where "Send MRW" is not configured, there is no need to signal the last discarded RLC SDU to the receiver. All $SN\_MRW_i$ fields indicating the end of the RLC SDUs to be discarded in the receiver are optionally included in the MWR SUFI. Only $SN\_MRW_{LENGTH}$, which indicates the receiver to discard all PDUs with a sequence number less than $SN\_MRW_{LENGTH}$ and move the reception window accordingly, is mandatorily included in the MWR SUFI. The shortened MRW SUFI has more chance to be piggybacked in an AMD PDU so that an additional STATUS PDU can be saved. The radio performance is therefore increased by this invention.

The MRW SUFI can generally accommodate fifteen discarded SDUs because LENGTH field is four bit long and both LENGTH=0000 and LENGTH=0001 cases indicate one discarded SDU. However, there are cases that fifteen discarded SDUs need be signalled in two separate SDU discard with explicit signalling procedures when "Send MRW" is configured. On the other hand, for the case that "Send MRW" is not configured, if there are more than 15 SDUs to be discarded, a single MRW SUFI, i.e. a single SDU discard with explicit signalling procedure is enough to signal the receiver to move its reception window.

The sender terminates the SDU discard with explicit signalling procedure if various criteria are fulfilled. However, in certain situations, the SDU discard with explicit signalling procedure will not be terminated.

In certain cases the receiver has moved its reception window to a position beginning from $SN\_MRW_{LENGTH}$, which is exactly what the transmitter wanted to signal to the receiver. If the procedure is not terminated when this criterion is fulfilled, the transmitter must retransmit MRW SUFI when Timer_MRW expires. This will waste radio resources and slow down the transmission throughput.

Furthermore, if the number of transmissions of MRW SUFI reaches its maximum value when this criterion is fulfilled, the RLC entity will unnecessarily reset itself. The transmission performance is degraded.

Therefore, the present invention provides a data discard signalling procedure wherein the MWR SUFI is shortened for cases where "Send MRW" is not configured and the sender shall efficiently terminate the SDU discard with explicit signalling procedure if certain criteria are fulfilled.

Consequently, utilizing the data discard signalling procedure of the present invention, transmission throughput is increased and the transmission performance is improved.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
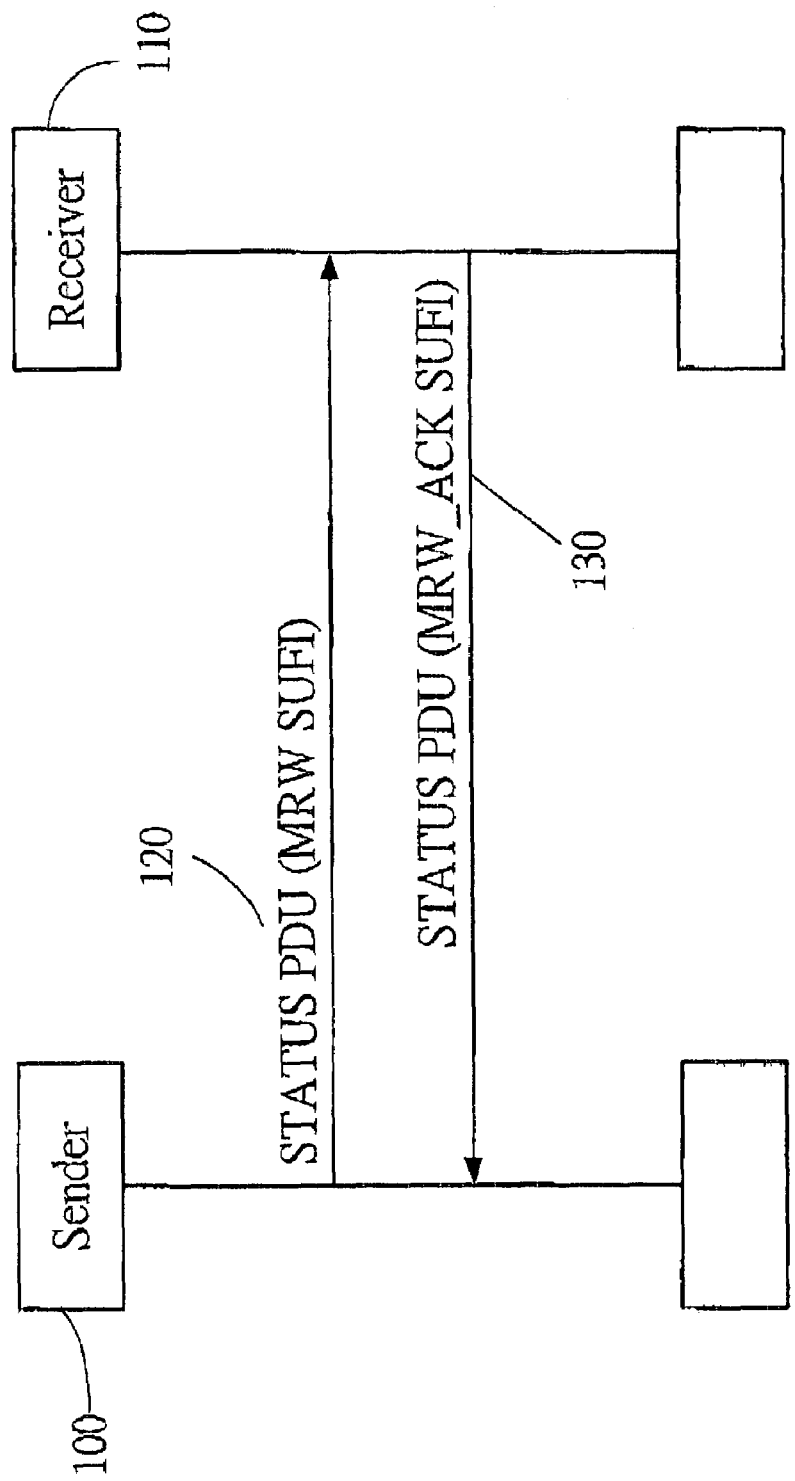
FIG. 1 is a diagram showing an SDU discard with explicit signalling procedure.

Reference will now be made in detail to the preferred embodiments of the present invention, examples of which are illustrated in the accompanying drawings. Wherever possible, the same reference numbers are used in the drawings and the description to refer to the same or like parts.

Figure 2:
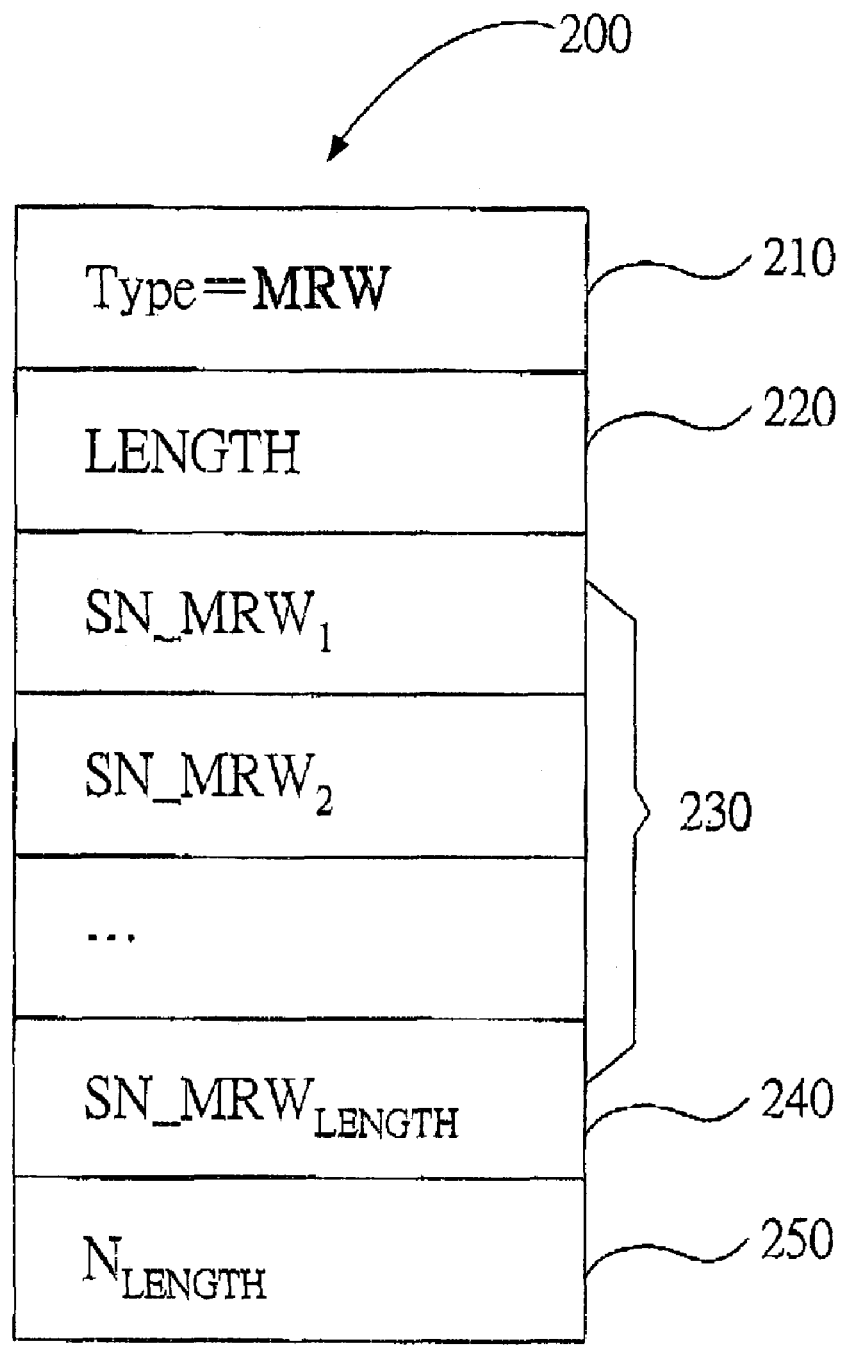
FIG. 2 is a drawing illustrating a format for a move receiving window super-field (MRW SUFI) according to an embodiment of the present invention.

A move receiving window super-field is used to request the receiver to move its reception window and optionally to indicate the set of discarded RLC SDUs, as a result of an RLC SDU discard in the sender. Refer to FIG. 2 which illustrates a format for the move receiving window super-field (MRW SUFI).

In an embodiment of the present invention, the length field 220 is 4 bits. It indicates the number of $SN\_MRW_i$ fields 230 in the super-field of type MRW 200.

The values "0001" through "1111" indicate that the number of $SN\_MRW_i$ fields contained in the MRW SUFI is 1 through 15 respectively. The value "0000" indicates that one $SN\_MRW_i$ field 230 is present and that the RLC SDU to be discarded in the receiver extends above the configured transmission window in the sender.

The $SN\_MRW_i$ fields 230 are 12 bits each. When "Send MRW" is configured, an $SN\_MRW_i$ 230 shall be used to indicate the end of each discarded RLC SDU, i.e. the number of $SN\_MRW_i$ fields 230 shall equal the number of RLC SDUs discarded by that MRW SUFI. When "Send MRW" is not configured, an $SN\_MRW_i$ field 230 shall be used to indicate the end of the last RLC SDU to be discarded in the receiver and additional ones may optionally be used to indicate the end of other discarded RLC SDUs.

$SN\_MRW_i$ is the sequence number of the PDU that contains the length indicator of the i:th RLC SDU to be discarded in the receiver (except for $SN\_MRW_{LENGTH}$ 240 when $N_{LENGTH}$=0). The order of the $SN\_MRW_i$ shall be in the same sequential order as the RLC SDUs that they refer to.

Additionally $SN\_MRW_{LENGTH}$ 240 requests the receiver to discard all PDUs with a sequence number less than $SN\_MRW_{LENGTH}$ 240, and to move the reception window accordingly.

Furthermore, when $N_{LENGTH}$ 250 is greater than 0, the receiver has to discard the first $N_{LENGTH}$ length indicators and the corresponding data octets in the PDU with sequence number $SN\_MRW_{LENGTH}$ 240.

$N_{LENGTH}$ 250 is 4 bits and is used together with $SN\_MRW_{LENGTH}$ 240 to indicate the end of the last RLC SDU to be discarded in the receiver.

$N_{LENGTH}$ 250 indicates which length indicator in the PDU with sequence number SN_MRW$_{LENGTH}$ 240 corresponds to the last RLC SDU to be discarded in the receiver. $N_{LENGTH}$ 250 equals 0 indicates that the last RLC SDU ended in the PDU with sequence number SN_MRW$_{LENGTH}$ 240 minus 1 and that the first data octet in the PDU with sequence number SN_MRW$_{LENGTH}$ 240 is the first data octet to be reassembled next.

Figure 3:
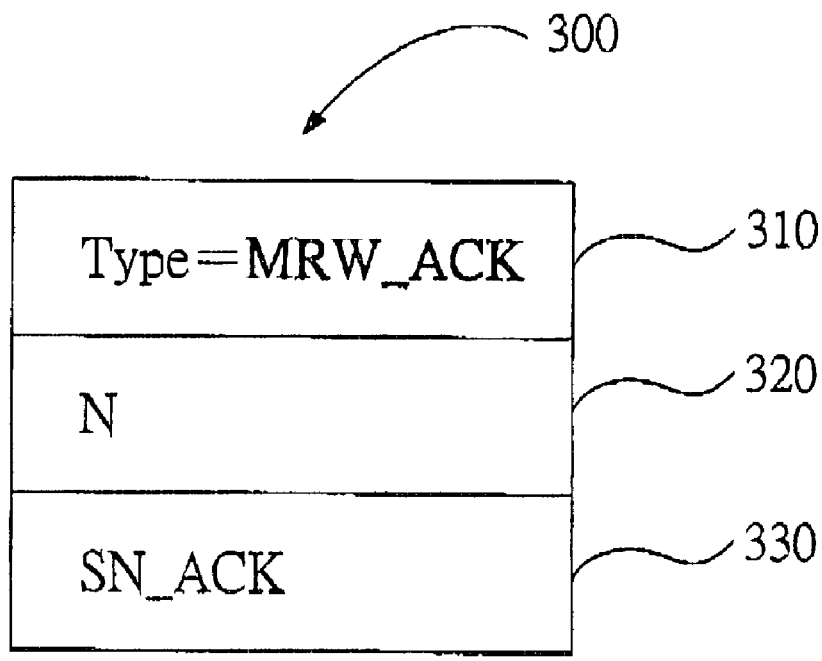
FIG. 3 is a drawing illustrating a format of an MRW_ACK according to an embodiment of the present invention.

A move receiving window acknowledgement super-field acknowledges the reception of a MRW SUFI. Refer to FIG. 3 which illustrates the format of the MRW_ACK 300.

The N field 320 is 4 bits and is set equal to the $N_{LENGTH}$ field in the received MRW SUFI if the SN_ACK field is equal to the SN_MRW$_{LENGTH}$ field. Otherwise N 320 shall be set to 0.

With the aid of this field in combination with the SN_ACK field 330, it can be determined if the MRW_ACK 300 corresponds to a previously transmitted MRW SUFI.

The SN_ACK field 330 is 12 bits and indicates the updated value of VR(R) after the reception of the MRW SUFI. With the aid of this field in combination with the N field 320, it can be determined if the MRW_ACK 300 corresponds to a previously transmitted MRW SUFI.

The sender terminates the SDU discard with explicit signalling procedure if one of the following criteria is fulfilled:
- a STATUS PDU/piggybacked STATUS PDU containing an MRW_ACK SUFI is received, and the SN_ACK field in the received MRW_ACK SUFI is greater than the SN_MRW$_{LENGTH}$ field in the transmitted MRW_SUFI, and the N field in the received MRW_ACK SUFI is set equal to "0000";
- a STATUS PDU/piggybacked STATUS PDU containing an MRW_ACK SUFI is received, and the SN_ACK field in the received MRW_ACK SUFI is equal to the SN_MRW$_{LENGTH}$ field in the transmitted MRW_SUFI, and the N field in the received MRW_ACK SUFI is set equal to the $N_{LENGTH}$ field in the transmitted MRW SUFI;
- a STATUS PDU/piggybacked STATUS PDU containing an ACK SUFI is received, and the LSN field in the received ACK SUFI is greater than the SN_MRW$_{LENGTH}$ field in the transmitted MRW SUFI.

Figure 4:
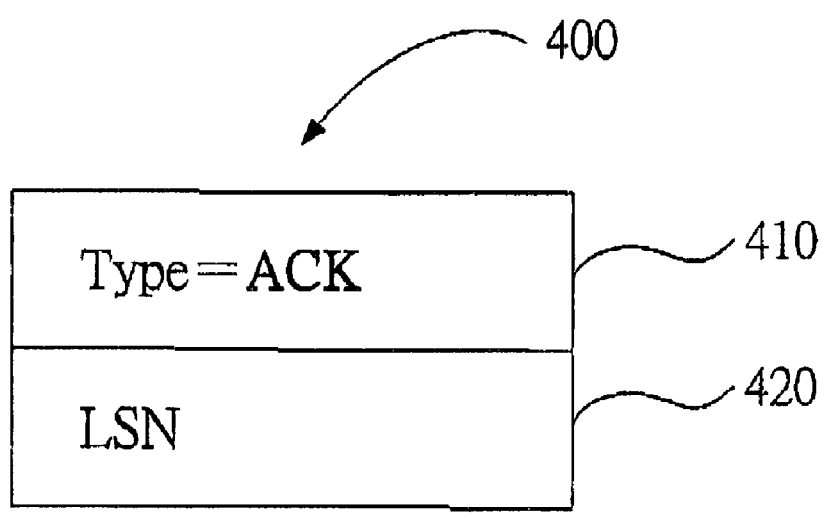
FIG. 4 is a drawing illustrating the ACK super-field in a STATUS PDU according to an embodiment of the present invention.

Refer to FIG. 4 which illustrates the ACK fields in a STATUS PDU. The acknowledgement super-field (ACK SUFI) 400 consists of a type identifier field (ACK) 410 and a sequence number (LSN) 420.

The LSN field 420 is 12 bits and acknowledges the reception of all PDUs with sequence number less than LSN and not indicated to be erroneous in earlier parts of the STATUS PDU. This means that if the LSN 420 is set to a value greater than VR(R), all erroneous PDUs shall be included in the same STATUS PDU and if the LSN 420 is set to VR(R), the erroneous PDUs can be split into several STATUS PDUs. At the sender or transmitter, if the value of the LSN 420 is less than or equal to the value of the first error indicated in the STATUS PDU, VT(A) will be updated according to the LSN 420. Otherwise VT(A) will be updated according to the first error indicated in the STATUS PDU. VT(A) is only updated based on STATUS PDUs where ACK SUFI (or MRW_ACK SUFI) is included. The LSN 420 shall not be set to a value greater than VR(H) or less than VR(R).

The third terminating criterion shown above can also be recognized as:
- a STATUS PDU/piggybacked STATUS PDU containing ACK SUFI is received, and this STATUS PDU/piggybacked STATUS PDU acknowledges all PDUs up to and including the PDU with sequence number equal to the SN_MRW$_{LENGTH}$ field in the transmitted MRW SUFI.

The above criterion is equivalent to:
- a STATUS PDU/piggybacked STATUS PDU containing ACK SUFI is received, VT(A) to be updated by this STATUS PDU/piggybacked STATUS PDU is greater than the SN_MRW$_{LENGTH}$ field in the transmitted MRW SUFI.

Figure 5:
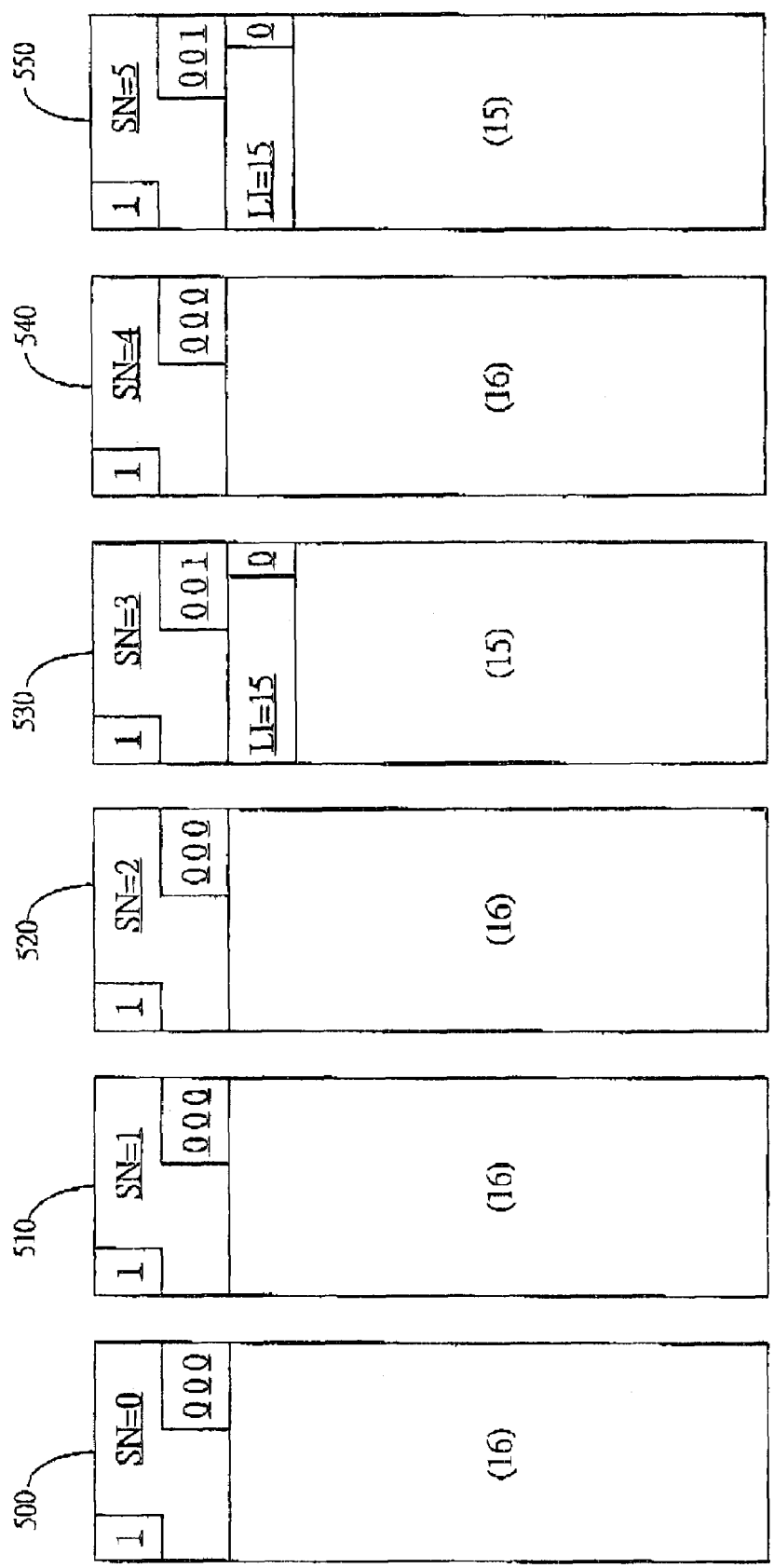
FIG. 5 is a drawing illustrating PDU structure according to an embodiment of the present invention.

Both of these criteria are equivalent to:
- On the reception of a STATUS PDU which contains an ACK SUFI indicating VR(R) is greater than SN_MRW$_{LENGTH}$ Refer to FIG. 5, which is a drawing illustrating PDU structure according to an embodiment of the present invention SDU1 is carried by PDUs of SN=0 500, SN=1 510, SN=2 520, and SN=3 530. SDU2 is carried by PDUs of SN=4 540 and SN=5 550. Suppose that "Send MRW" is not configured for this RLC entity and SDU1 is discarded by the sender so that a SDU discard with explicit signalling procedure is initiated. The previous example illustrated "an SN_MRW$_i$ field 230 shall be used to indicate the end of the last RLC SDU to be discarded in the receiver". Thus, two SN_MRW$_i$ fields will be needed: SN_MRW$_1$=3 (12 bits) and SN_MRW$_2$=SN_MRW$_{LENGTH}$=4(12 bits), together with LENGTH=2 (0010, 4 bits) and $N_2$=$N_{LENGTH}$=0000 and Type=MWR(4 bits). Thus, at least a total of 36 bits is needed.

In fact, for the case where "Send MRW" is not configured, there is no need to signal the last discarded RLC SDU to the receiver. Thus, SN_MRW$_1$=3 can be omitted in the MRW SUFI. Therefore, twelve bits can be saved. The shortened MRW SUFI has more chance to be piggybacked in an AMD PDU so that an additional STATUS PDU can be saved. The radio performance is therefore increased by this invention. This is another advantage of the present invention.

In general, at the sender, if "Send MRW" is not configured for this RLC entity, all SN_MRW$_i$ fields indicating the end of the RLC SDUs to be discarded in the receiver are optionally included in the MWR SUFI. Only SN_MRW$_{LENGTH}$ indicating the receiver to discard all PDUs with a sequence number less than SN_MRW$_{LENGTH}$, and to move the reception window accordingly are mandatorily included.

In addition, if SN_MRW$_{LENGTH}$ is the only SN_MRW$_i$ field included in the MRW SUFI:
LENGTH=0001 if SN_MRW$_{LENGTH}$ is within the configured transmission window; or
LENGTH=0000 if SN_MRW$_{LENGTH}$ is above the configured transmission window.

Refer to FIG. 5 again. If SDU1 carried on PDUs of SN=0 500 through SN=3 530 is discarded, the contents of MWR SUFI will be 24 bits long only: Type=MRW (4 bits), LENGTH=0001, SN_MWR$_1$=4 (12 bits), $N_1$=0000. Thus 12 bits fewer are needed.

The MRW SUFI 200 can generally accommodate fifteen discarded SDUs because LENGTH field 220 is four bit long and both LENGTH=0000 and LENGTH=0001 cases indicate one discarded SDU. However, there are cases that fifteen discarded SDUs need be signalled in two separate SDU discard with explicit signalling procedures when "Send MRW" is configured. On the other hand, for the case that "Send MRW" is not configured, if there are more than 15 SDUs to be discarded, a single MRW SUFI, i.e. a single SDU discard with explicit signalling procedure is enough to signal the receiver to move its reception window.

For the case where "Send MRW" is configured, when the last discarded SDU ended in an AMD PDU, and its Length Indicator is present in the same AMD PDU, and no new SDU is present inside this AMD PDU, $SN\_MRW_{LENGTH}$ 240 must be set to equal to 1 plus the sequence number of the PDU which contains the length indicator of the last discarded SDU. Only fourteen $SN\_MRW_i$ fields 230 are left to indicate the end of each discarded SDUs. Therefore, if the fifteenth discarded SDUs ended in an AMD PDU, and its Length Indicator is present in the same AMD PDU, and no new SDU is present inside this AMD PDU, this SDU can not be fitted in the same MRW SUFI 200 as the other fourteen discarded SDUs and two separate SDU discard with explicit signalling procedures must be initiated.

For the case where "Send MRW" is not configured, only $SN\_MRW_{LENGTH}$ 240 is needed in spite of how many SDUs to be discarded. If there are more than fifteen SDUs to be discarded for this case, one SDU discard with explicit signalling procedure is enough. No separate procedures are needed. This will speed up the SDU discard procedure and improve the radio transmission performance.

In addition, in certain situations, the SDU discard with explicit signalling procedure will not be terminated. The following criterion will not terminate the SDU discard with explicit signalling procedure:

a STATUS PDU/piggybacked STATUS PDU containing ACK SUFI is received, VT(A) to be updated by this STATUS PDU/piggybacked STATUS PDU is equal to the $SN\_MRW_{LENGTH}$ field in the transmitted MRW SUFI.

In fact, when the above criterion is fulfilled, the receiver has moved its reception window to a position beginning from $SN\_MRW_{LENGTH}$, which is exactly what the transmitter wanted to signal to the receiver. If the procedure is not terminated when this criterion is fulfilled, the transmitter must retransmit MRW SUFI when Timer_MRW expires. This will waste radio resources and slow down the transmission throughput.

Furthermore, if the number of transmissions of MRW SUFI reaches its maximum value when this criterion is fulfilled, the RLC entity will unnecessarily reset itself. The transmission performance is degraded.

Therefore, an embodiment of the present invention provides that the sender shall terminate the SDU discard with explicit signalling procedure if the following criterion is fulfilled:

a STATUS PDU/piggybacked STATUS PDU containing ACK SUFI is received, VT(A) to be updated by this STATUS PDU/piggybacked STATUS PDU is greater than or equal to the $SN\_MRW_{LENGTH}$ field in the transmitted MRW SUFI.

In another embodiment of the present invention, the sender shall terminate the SDU discard with explicit signalling procedure if the following criterion is fulfilled:

a STATUS PDU/piggybacked STATUS PDU containing ACK SUFI is received, and this STATUS PDU/piggybacked STATUS PDU acknowledges all PDUs up to and including the PDU with sequence number equal to the $SN\_MRW_{LENGTH}$ field in the transmitted MRW SUFI minus one.

In another embodiment of the present invention, the sender shall terminate the SDU discard with explicit signalling procedure if the following criterion is fulfilled:

On the reception of a STATUS PDU which contains an ACK SUFI indicating VR(R) is greater than or equal to $SN\_MRW_{LENGTH}$ If any of these various criteria are met, the SDU discard with explicit signalling procedure can be efficiently terminated resulting in increased transmission throughput. Utilizing the data discard signalling procedure of the present invention, transmission throughput is increased and the transmission performance is improved.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for a service data unit, called SDU hereafter, discard with explicit signalling procedure, comprising:

a sender discarding at least one SDUs;

the sender transmitting a first status protocol data unit (STATUS PDU1) comprising a move receiving window super-field, called MRW SUFI hereafter, to a receiver, wherein the MRW SUFI comprises at least a sequence number field $SN\_MRW_{LENGTH}$ indicating the receiver to discard all PDUs with sequence number $<SN\_MRW_{LENGTH}$ and to move a reception window to begin at a sequence number equal to $SN\_MRW_{LENGTH}$; and the sender terminating the SDU discard with explicit signalling procedure when receiving a second status protocol data unit (STATUS PDU2) from the receiver;

wherein the second status protocol data unit (STATUS PDU2) indicates that all protocol data units, called PDUs hereafter, up to and including a PDU with a sequence number equal to $SN\_MRW_{LENGTH}$ minus one has been received or discarded by the receiver.

2. The method of claim 1, wherein the first status protocol data unit (STATUS PDU1) is a piggybacked STATUS PDU.

3. The method of claim 1, wherein the second status protocol data unit (STATUS PDU2) is a piggybacked STATUS PDU.

* * * * *